United States Patent
Ince et al.

(10) Patent No.: US 10,167,938 B2
(45) Date of Patent: Jan. 1, 2019

(54) COMPACT PLANETARY DIFFERENTIAL

(71) Applicant: Schaeffler Technologies AG & Co. KG, Herzogenaurach (DE)

(72) Inventors: Marion Jack Ince, Mount Holly, NC (US); Guihui Zhong, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/596,400

(22) Filed: May 16, 2017

(65) Prior Publication Data

US 2018/0335120 A1    Nov. 22, 2018

(51) Int. Cl.
*F16H 48/38*    (2012.01)
*F16H 48/11*    (2012.01)
*F16H 48/10*    (2012.01)

(52) U.S. Cl.
CPC .............. *F16H 48/11* (2013.01); *F16H 48/38* (2013.01); *F16H 2048/106* (2013.01); *F16H 2048/108* (2013.01)

(58) Field of Classification Search
CPC .... F16H 48/11; F16H 48/38; F16H 2048/106; F16H 2048/108
See application file for complete search history.

(56) References Cited

U.S. PATENT DOCUMENTS

| 1,420,798 | A | * | 6/1922 | Weston | F16H 48/10 74/650 |
| 3,127,791 | A | * | 4/1964 | Roe | F16H 37/00 475/10 |
| 3,406,593 | A | * | 10/1968 | Vesey | F16H 48/10 475/249 |

(Continued)

FOREIGN PATENT DOCUMENTS

| CN | 103671812 A | 3/2014 |
| CN | 103671813 A | 3/2014 |

(Continued)

OTHER PUBLICATIONS

Hohn, Bernd-Robert et al., "Compact Final Drive for Vehicles with Front Wheel Drive and Transversely Mounted Engine", ATZ, Jan. 2006, vol. 108, pp. 14-16. (German and English Version).

*Primary Examiner* — Jacob S. Scott
*Assistant Examiner* — Tinh Dang
(74) *Attorney, Agent, or Firm* — Volpe and Koenig, P.C.

(57) ABSTRACT

A compact planetary differential includes a drive input ring gear having external teeth and a planet gear carrier connected rotationally fixed to the drive input ring gear. First planet gears are located on a first axial side of the planet gear carrier, and second planet gears are located on a second axial side, with the first and second planet gears being arranged in intermeshing pairs, and the planet gear carrier including interface openings. Pin plates include aligned openings for first planet gears and the second planet gears. Pinion shafts (Continued)

extend through these aligned openings and pinion shaft openings in the planet gear carrier. A single one of the first or second planet gears is rotatably supported on each respective one of the pinion shafts. A first sun gear engages with the first planet gears, and a second sun gear engages with the second planet gears.

20 Claims, 6 Drawing Sheets

(56) References Cited

U.S. PATENT DOCUMENTS

| | | | | |
|---|---|---|---|---|
| 3,412,632 | A * | 11/1968 | McFiggans | F16H 48/10 |
| | | | | 475/10 |
| 3,499,348 | A | 3/1970 | Hartupee | |
| 3,791,237 | A | 2/1974 | Kitano et al. | |
| 5,484,348 | A * | 1/1996 | Brown | B60K 17/346 |
| | | | | 475/248 |
| 8,221,278 | B2 | 7/2012 | Biermann et al. | |
| 8,480,532 | B2 | 7/2013 | Biermann et al. | |
| 2004/0220011 | A1 * | 11/2004 | Gumpoltsberger | B60K 17/16 |
| | | | | 475/205 |
| 2014/0315677 | A1 | 10/2014 | Edler | |
| 2015/0267798 | A1 * | 9/2015 | Biermann | F16H 48/11 |
| | | | | 475/252 |

FOREIGN PATENT DOCUMENTS

| | | |
|---|---|---|
| CN | 103775601 A | 5/2014 |
| WO | 2014040592 A1 | 3/2014 |

\* cited by examiner

COMPACT PLANETARY DIFFERENTIAL

FIELD OF THE INVENTION

The present invention is related to the field of drive trains for motor vehicles, and in particular to differentials.

BACKGROUND

Motor vehicles typically include a drive train with a primary drive, such as an internal combustion engine, which is paired with a transmission in order to provide different gear drive ratios from the engine to the drive wheels. Typically, the transmission is connected to a differential which transmits torque from the transmission to output axles, with the differential compensating for different rotational speeds of wheels attached to the output axles which occurs, for example, during turning.

Differentials are also known in the form of both spur gear differentials and bevel gear differentials. Spur gear differentials provide an advantage in that the axial length of the differential in a direction of the output axes is drastically reduced in comparison to a bevel gear differential. Spur gear differentials utilize spur gears connected to a planetary gear carrier that itself is driven by the transmission output and drives the output axles via sun gears that engage the planetary gears. Here a first set of planet gears is associated with the first sun and a second set of planet gears is associated with the second sun, with the first and second planet gears also intermeshing via the first set of planet gears axially overlapping and engaging the second set of planet gears. The number of teeth of the planet gears of both sets is equal and the number of teeth of the first and second sun gears is also equal. Generally, the teeth of the first sun gear are arranged on a crown circle with a crown circle diameter that is different than the crown circle diameter of the crown circle on which the teeth of the second sun are arranged so that the first set of planet gears meshes with only the first sun and the second set of planet gears meshes only with the second sun. Such a spur gear differential is known from U.S. Pat. No. 8,480,532, which is owned by the assignee of the present invention and is incorporated herein by reference as if fully set forth.

Other experimentation with spur gear differentials has been conducted by the predecessor to the assignee of the present invention in conjunction with the Gear Research Center at the Technical University Munich and General Motors Powertrain Germany GmbH where the sun gears were provided as gears with internal ring teeth that engaged with the planet gears.

Bevel gear differentials include a carrier in which a pair of drive bevel gears are mounted that engage with a pair of driven bevel gears having a common axis that is arranged perpendicular to the common axis of the drive bevel gears. The driven bevel gears are connected to the output axels.

The automotive field continues to strive for further ways to reduce the weight of motor vehicles in order to increase efficiency. Additionally, making portions of the drive train modular for easier installation and removal of the engine, transmissions, and differential has also been a consideration in order to reduce assembly costs.

It would be beneficial to reduce the weight of the drive train of a motor vehicle as well as reduce installation space. It would also be advantageous to reduce manufacturing costs. This must all be achieved without sacrificing functionality or reliability.

SUMMARY

A compact planetary differential is provided that includes a drive input ring gear having external teeth and a planet gear carrier having first and second axial sides connected rotationally fixed to the drive input ring gear. First planet gears are located on the first axial side of the planet gear carrier, and second planet gears are located on the second axial side of the planet gear carrier, with the first and second planet gears being arranged in intermeshing pairs, and the planet gear carrier including interface openings through which the respective intermeshing pairs of the first and second planet gears contact one another. First and second pin plates are located respectively on the first and second axial sides of the planet gear carrier, with the first and second pin plates including aligned openings at a position for each of the first planet gears and each of the second planet gears. Pinion shafts extend through these aligned openings in the first and second pin plates and pinion shaft openings in the planet gear carrier. A single one of the first or second planet gears is rotatably supported on each respective one of the pinion shafts. The pinion shafts are preferably connected to the pin plates and clamp the pin plates against the planet gear carrier. A first sun gear, preferably having a first hub, a first web, and a first external rim with a first internal ring gear, is located on the first axial side of the planet gear carrier and engages with the first planet gears, preferably by intermeshing contact with the first internal ring gear. Therefore, the first sun internal ring gear orbits around the first planet gears. A second sun gear, preferably having a second hub, a second web, and a second external rim with a second internal ring gear, is located on the second axial side of the planet gear carrier and engages with the second planet gears, preferably by intermeshing contact with the second internal ring gear. Therefore, the second sun internal ring gear orbits around the second planet gears. Preferably, the planet gear carrier includes at least one recess adjacent to the first and second hubs, and at least one support bearing is located in the at least one recess which is adapted to receive ends of first and second axles that extend through the first and second hubs. This arrangement provides a planetary differential that is more compact than the known prior art spur gear or planetary differentials. Further, the first and second planet gears, the first and second sun gears, and the first and second pin plates are preferably respectively interchangeable, reducing the number of different parts that need to be manufactured, which reduces costs and simplifies assembly. Further, the arrangement of the pin plates at each end of the pinion shafts provides a mechanically robust assembly that improves reliability and service life.

In one preferred arrangement, the compact planetary differential further includes a respective needle bearing located between each of the first and second planet gears and the respective pinion shaft. This increases service life and reduces internal friction.

Preferably, the at least one recess includes first and second recesses located respectively on the first and second axial sides of the planet gear carrier, and the at least one support bearing comprises first and second support bearings. The first support bearing is located in the first recess and the second support bearing is located in the second recess. To reduce friction and increase service life, preferably the support bearings are rolling bearings.

In one preferred embodiment, axially outwardly facing sides of the openings in the first and second pin plates are chamfered, and ends of the pinion shafts are staked in the openings. They could also be retained by other means.

Preferably, the first and second hubs include internal splines that are adapted to slidingly receive splined axle ends.

In a preferred arrangement of the compact planetary differential, the axes of the first planet gears and the axes of the second planet gears are located radially at an equal distance from an axis of the compact planetary differential. Preferably, this equal distance of the axes of the first and second planet gears from the axis of the compact planetary gear differential is less than 60% of a diameter of the input ring gear.

To reduce manufacturing costs, the first sun gear and the second sun gear may be forged to a net shape, and the teeth are preferably hardened. The sun gears could also be machined and hardened. Depending on the application and the loads being carried, it is also possible that they could be cast or formed by powder metallurgy.

In one preferred arrangement, annular recesses are provided on the first and second axial sides of the planet gear carrier which at least partially receive, respectively, the first external rim of the first sun gear and the second external rim of the second sun gear. This can provide a shielded arrangement to keep debris from entering the gear area. It is also possible to provide a first seal between the first external rim and the recess in the first axial side of the planet gear carrier, and a second seal between the second external rim and the recess in the second axial side of the planet gear carrier. However, this arrangement is not required, and the entire compact planetary differential could be located in an external housing and run in a gear oil bath.

First and second axles may be provided separately or together with the compact planetary differential. These axles include splined ends that engage in the respective first and second hubs. The first and second axles are preferably aligned with the axis of the compact planetary differential, and cylindrical support sections extend from the splined ends, and the at least one support bearing is located on the cylindrical support sections.

In a preferred arrangement, the first planet gears axially overlap the second planet gears by at least about 25% of an axial tooth dimension of the first and second planet gears.

Preferably, the planetary gear carrier includes first counterbores on the first axial side that receive the first planetary gears and second counterbores on the second side that receive the second planetary gears, and the interface openings are formed by an axial overlap of the first and second counterbores.

In order to reduce weight and manufacturing costs, the drive input ring gear can be formed as a separate part made from steel that is then connected to the planet gear carrier. The planet gear carrier can be machined or otherwise formed from a lower grade steel alloy or aluminum, or any other suitable material In a preferred arrangement, a radially innermost part of each of the first and second planet gears are radially within 0.2 inches of a radially outer part of the first and second hubs to provide a radially compact arrangement. This arrangement of the planet gears as close as possible to the axis of the compact planetary differential results in an overall reduced radial size in comparison to the known prior art.

As will be recognized by those of ordinary skill in the art from the present disclosure, the above-noted features can be utilized alone or in various combinations in order to provide a low cost, reduced size and weight differential for various motor vehicle applications.

BRIEF DESCRIPTION OF THE DRAWINGS

The foregoing Summary as well as the following Detailed Description will be best understood when read in conjunction with the appended drawings which show a preferred embodiment of the invention. In the drawings.

DETAILED DESCRIPTION OF THE PREFERRED EMBODIMENTS

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. The term "about" means within typical manufacturing tolerances of a preferred number or range. These terms and terms of similar import are for ease of description when referring to the drawings and should not be considered limiting. "Axially" refers to a direction along the axis of a shaft or similar object. A reference to a list of items that are cited as "at least one of a, b, or c" (where a, b, and c represent the items being listed) means any single one of the items a, b, or c, or combinations thereof.

For elements of the invention that are identical or have identical actions, identical reference symbols are used. The illustrated embodiments represent merely examples for how the device according to the invention could be equipped. They do not represent a conclusive limitation of the invention.

Referring to FIGS. 1-4, a first embodiment of a compact planetary differential 10 is shown. The compact planetary differential 10 includes a drive input ring gear 12 having external teeth 14. A planet gear carrier 16 having first and second axial sides 17, 18 is connected rotationally fixed to the drive input ring gear 12. The drive input ring gear 12 and the planet gear carrier 16 may be formed integrally, for example, by being machined from a single piece of material, or may be formed separately from two different materials with the ring gear 12 being made of steel and having at least the teeth 14 hardened. In this case, the planet gear carrier 16 can be made of a lower grade steel, aluminum, or other suitable material and being connected to the ring gear 12, for example via welding, bolts, rivets, or any other suitable connection.

Figure 1:
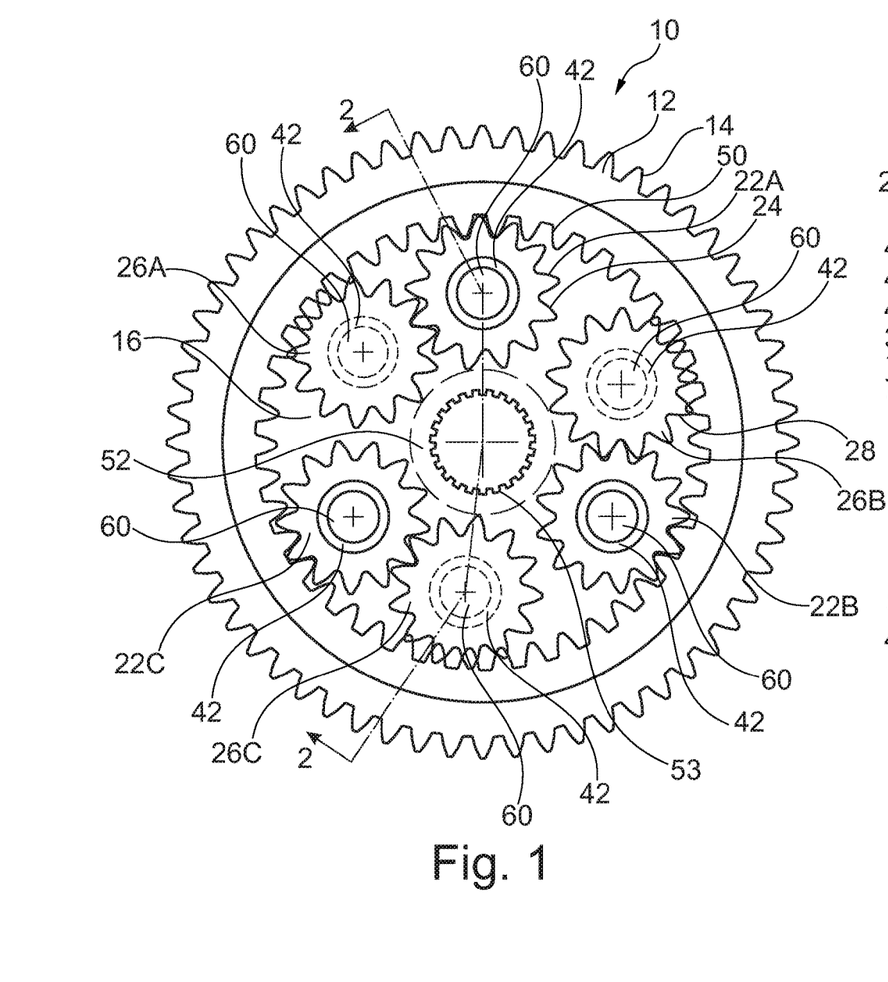
FIG. 1 is side elevational view, with some components removed for clarity, of a compact planetary differential.

First planet gears 22A-C are located on the first axial sides 17 of the planet gear carrier 16. Second planet gears 26A-C are located on the second axial side 18 of the planet gear carrier 16. The first planet gears 22A-22C preferably have teeth 24 and the second planet gears 26A-26C preferably have teeth 28. The first and second planet gears 22A-22C and 26A-26C are arranged in intermeshing pairs, and the planet gear carrier 16 includes interface openings 30 through which the respected intermeshing pairs 22A, 26A; 22B, 26B; 22C, 26C of the first and second planet gears 22A-22C, 26A-26C contact one another. The planet gears 22A-22C, 26A-26C are preferably made of steel and may be machined, forged, produced by casting or may be made of other materials for example produced by a powder metallurgy or any other suitable formation method to provide teeth 24, 28 having the desired profiles and suitable tolerances for the particular application. As shown in FIGS. 1 and 3, the axes of the first planet gears 22A-22C and the axes of the second planet gears is 26A-26C are located at an equal distance R from an axis of the compact planetary differential. In a preferred arrangement, the first and second planet gears 22A-22C, 26A-26C are interchangeable. Detailed drawings showing the preferred planet gear 22A-22C, 26A-26C are provided at FIGS. 7 and 8. As shown most clearly in FIGS. 2 and 16, the first planet gears 22A-22C overlap the second planet gears 26A-26C by at least 25% of an axial tooth dimension W of the first and second planet gears 22A-22C, 26A-26C.

Figure 2:
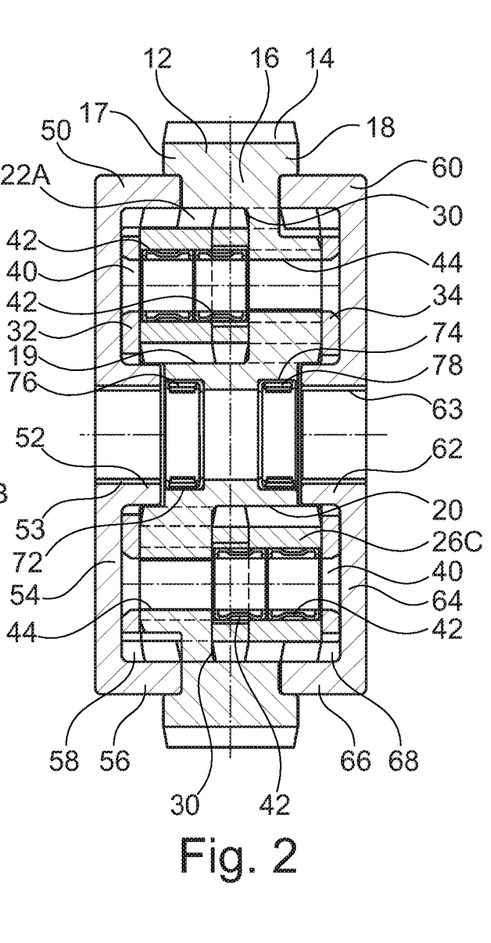
FIG. 2 is a cross-sectional view taken through compact planetary differential of FIG. 1 taken along line 2-2 in FIG. 1.
Figure 3:
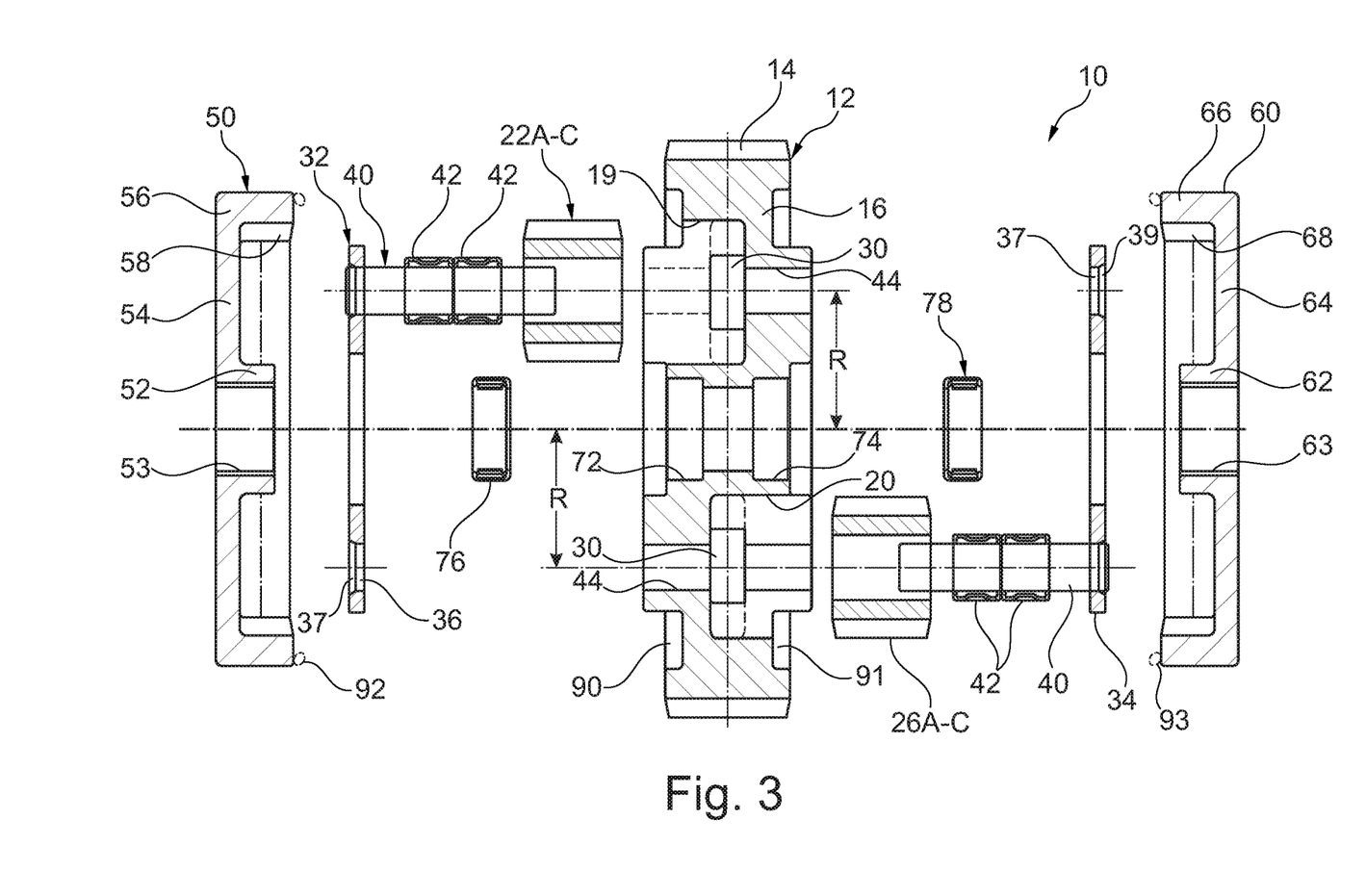
FIG. 3 is an exploded cross-sectional view showing the components of the compacts planetary differential of FIGS. 1 and 2.
Figures 5, 6, 7, 8, 9, 10, 11, 12:
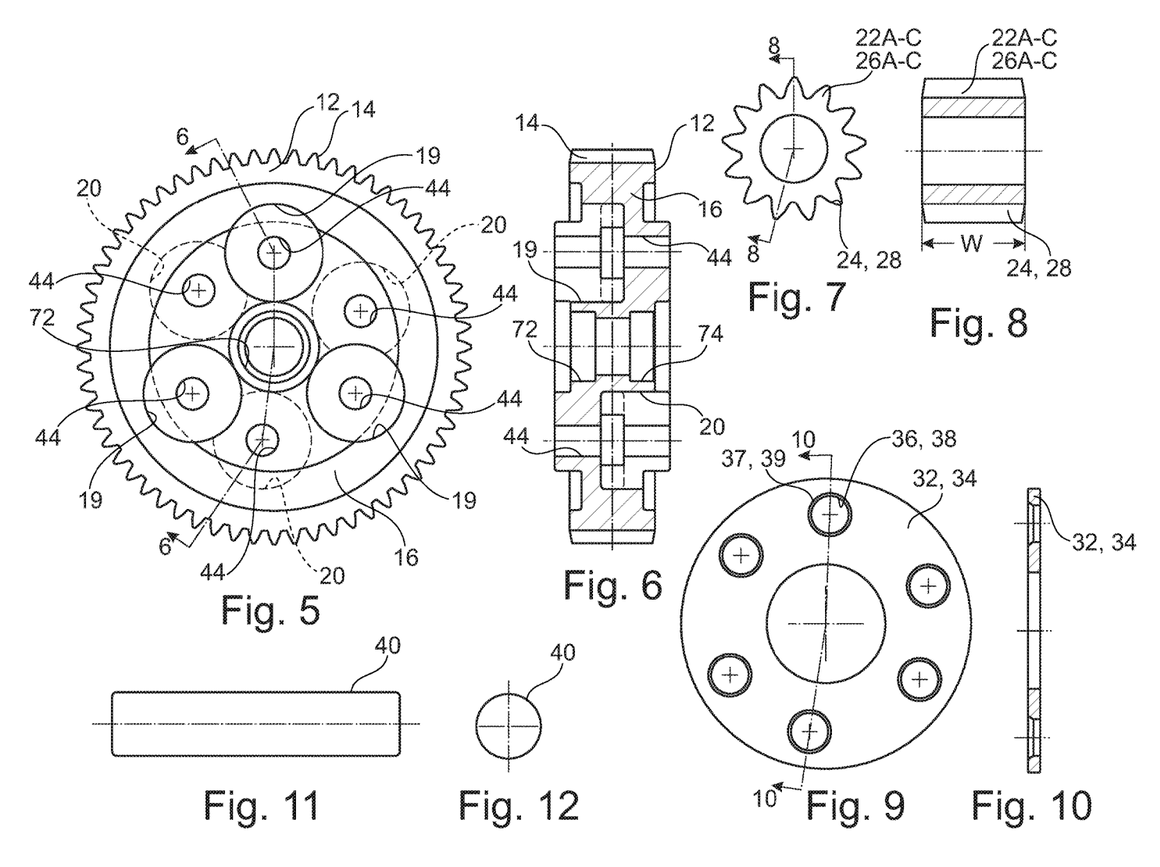
FIG. 5 is a side view of the planet gear carrier and drive input ring gear.
FIG. 6 is a cross-sectional view taken along lines 6-6 in FIG. 5.
FIG. 7 is a side view of a planet gear.
FIG. 8 is a cross-sectional view taken along line 8-8 in FIG. 7.
FIG. 9 is a side view of a pin plate.
FIG. 10 is a cross-sectional view taken along line 10-10 in FIG. 9.
FIG. 11 is a side view of a pinion shaft used for supporting a planet gear.
FIG. 12 is an end view of the pinion shaft shown in FIG. 11.

As shown in detail in FIGS. 2 and 3, as well as in FIGS. 5 and 6, which show details of the planet gear carrier 16 with the drive input ring gear 12, preferably the planet gear carrier 16 includes first counter bores 19 on the first axial side 17 that received the first planet gears 22A-22C, and second counter bores 20 on the second axial side 18 that received the second planet gears 26A-26C. The interface openings 30 are formed by an axial overlap of the first and second counter bores 19, 20.

While in the preferred embodiment, 3 intermeshing pairs of the first and second planet gears 22A, 26A; 22B, 26B; 22C, 26C are shown, those skilled in the art will recognize that the number of intermeshing pairs of the first and second planet gears can be varied. Preferably, there are at least two and the intermeshing pairs of the planet gears that are spaced part equally in the circumferential direction.

Still with reference to FIGS. 1-4, first and second pin plates 32, 34 are located respectively on the first and second axial side 17, 18 of the planet gear carrier 16. The first and second pin plates 32, 34 include aligned openings 36, 38 at a position for each of the first planet gears 22A-22C and each of the second planet gears 26A-26C. Details of the preferred pin plate are shown in FIGS. 9 and 10. Preferably, the first and second pin plates 32, 34 are interchangeable. However, these could be provided at opposite-hand parts. In a preferred embodiment, the pin plates 32, 34 are made from steel. However, other materials could be used, depending upon the particular application.

Pinion shafts 40 extend through aligned openings 36, 38 in the first and second pin plates 32, 34 and pinion shaft openings 44 in the planet gear carrier 16. These pinion shaft openings 44 in the planet gear carrier 16 are shown in detail in FIGS. 5 and 6. A single one of the first or second planet gears 22A-22C, 26A-26C are rotatably supported on each respective one of the pinion shafts 40. The connection of the pinion shafts 40 to the pin plates 32, 34 preferably clamps the pin plates 32, 34 against the planet gear carrier 16. In the preferred embodiment, a respective needle bearing 42 is located between each of the first and second planet gears 22A-22C; 26A-26C and the respective pinion shaft 40. As illustrated in detail in FIG. 4, depending upon the particular configuration and load on the planet gears 22A-22C; 26A-26C, two adjacent needle bearings 42 can be provided for each of the first and second planet gears 22A-22C; 26A-26C.

In a preferred embodiment, the axially outwardly facing sides of the openings 36, 38 in the first and second pin plates, 32, 34 include chamfers 37, 39 as shown in detail in FIGS. 9 and 10. As shown in detail in FIGS. 2 and 16, preferably the ends of the pinion shafts 40 are roller staked in the openings 36, 38 and enlarged to be locked into the chamfers 37, 39. Alternatively, the connection between the pinion shafts 40 and the pin plates 32, 34 can be by welding or any other suitable connection, such as a press fit. Axial washers or bearings may be located between the planet gears 22A-22C, 26A-26C, the sides of the planet gear carrier 16, and the pin plates 32, 34 in order to reduce friction. These have not been shown and are optional for use in one or more of the indicated locations in order to ensure that the planet gears rotate freely.

Figure 4:
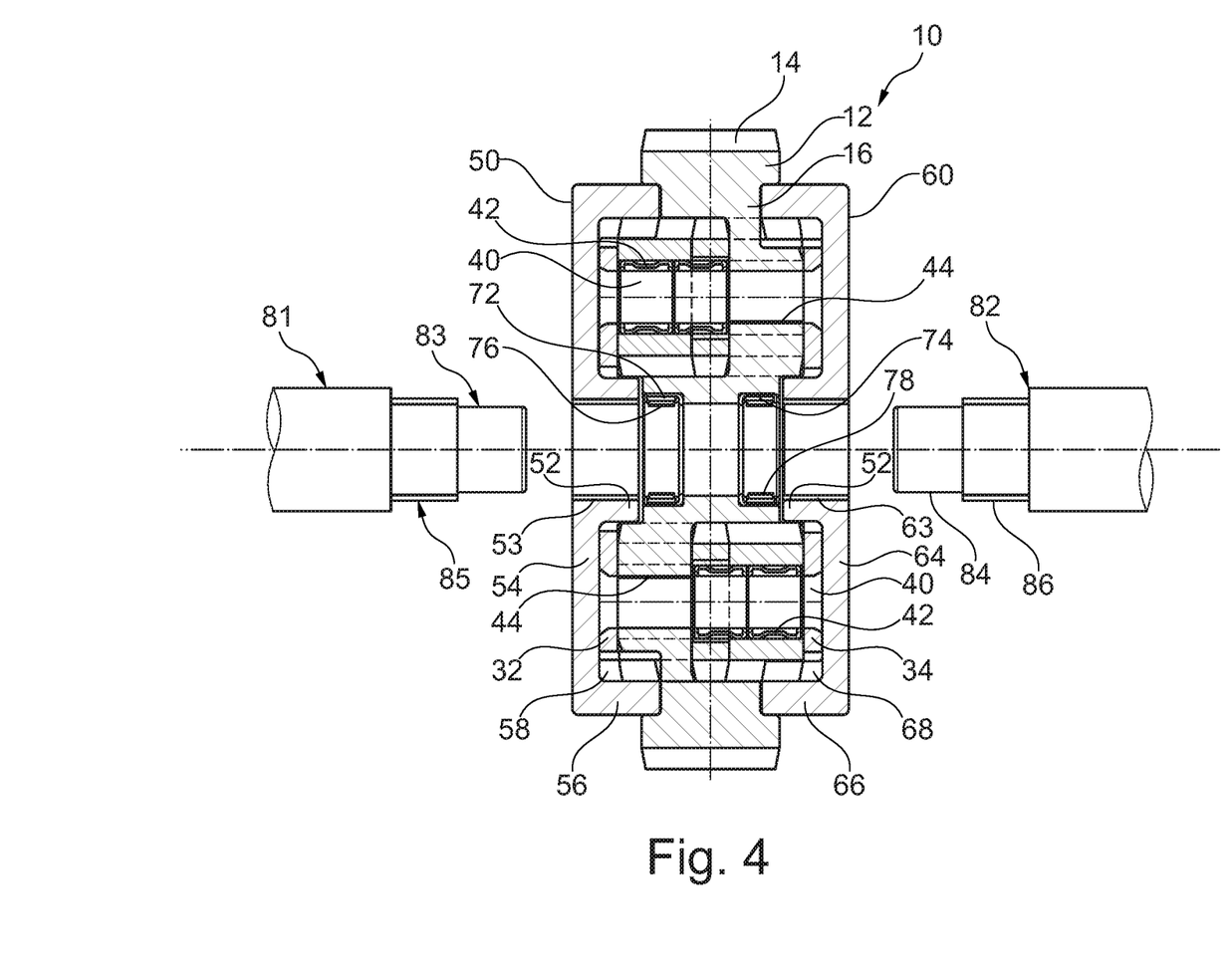
FIG. 4 is a cross-sectional view of the compact planetary differential similar to FIG. 2 showing insertion of two axles.
Figures 13, 14, 15, 16:
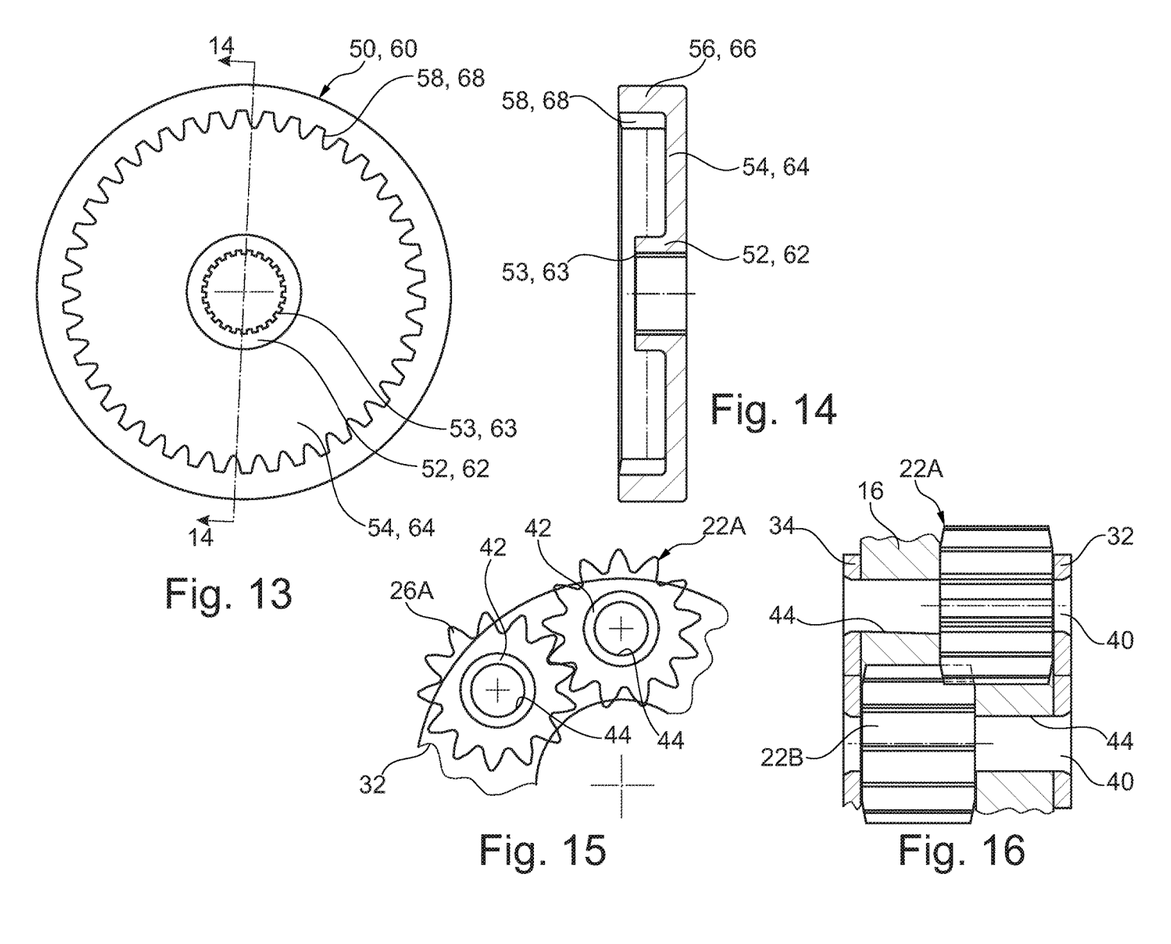
FIG. 13 is a side elevational view looking into a sun gear.
FIG. 14 is a cross-sectional view taken along line 14-14 in FIG. 13.
FIG. 15 is a partial side view showing first and second intermeshing planet gears located on a pin plate.
FIG. 16 is a partial cross-sectional view showing first and second intermeshing planet gears located in the planet gear carrier and held in position on pinion shafts connected to two of the pin plates.

Still with reference to FIGS. 1-4, a first sun gear 50 having a first hub 52, a first web 54, and a first external rim 56 with a first internal ring gear 58 is located on a first axial side 17 of the planet gear carrier 16. The first internal ring gear 58 engages the first planet gears 22A-22C. A second sun gear 60 is also provided having a second hub 62, a second web 64, and a second external rim 66 with a second internal ring gear 68 is located on the second axial side 18 of the planet gear carrier 16. The second internal ring gear 68 engages with the second planet gears 26A-26c. In the first sun gear 50 and the second sun gear 60 are preferably forged to a net shape and are preferably interchangeable, thereby reducing part count. One preferred form of the sun gear 50, 60 is illustrated in FIGS. 13 and 14. As shown in detail in FIGS. 3, 4, 13 and 14, preferably the first and second hubs 52, 62 include internal splines 53, 63 that are adapted to slidingly receive splined axle ends. This is shown in FIG. 4 where first and second axles 81, 82 are illustrated having respective splined ends 85, 86 which include splines that are adapted to slidingly engage with the internal splines 53, 63, of the first and second hubs 52, 62.

The planet gear carrier 16 includes at least one recess 72, 74 adjacent to the first and second hubs 52, 62, as illustrated best in FIGS. 2, 3, and 4. At least one support bearing, and preferably first and second support bearing 76, 78, are located in the at least one recess 72, 74 and are adapted to receive ends, formed as cylindrical support sections 83, 84, of the first and second axles 81, 82, that extend through the first and second hubs 52, 54.

In one preferred arrangement, the first and second axles 81, 82, including the splined ends 85, 86 that engage in the respective first and second hubs 52, 54 can be provided with the compact planetary differential 10. These first and second axles 81, 82 are aligned with the axis of the compact planetary differential 10 and the cylindrical support sections 83, 84 extend from the splined ends and support the planet gear carrier 16 via support bearings 76, 78 which are located on the cylindrical support sections 83, 84 of the axles 81, 82.

As shown, in the preferred embodiment, the at least one recess 72, 74 comprises first and second recesses 72, 74 located respectively on the first and second axial side 17, 18 of the planet gear carrier 16. The at least one support bearing therefore comprises first and second support bearing 76, 78, and the first support bearing 76 is located in the first recess 72 and the second support bearing 78 is located in the second recess 74. The first and second support bearing 76, 78 are preferably roller bearings and include an outer race formed of a bearing grade steel. Preferably, the cylindrical support sections 83, 84 of the axles 81, 82 ride directly on rollers of these bearings.

As shown in detail in FIGS. 2 and 3, in one preferred arrangement annual recesses 90, 91 are provided on the first and second axial side 17, 18 of the planet gear carrier 16 which at least partially received, respectively, the first external rim 56 of the first sun gear 50 and the second external rim 66 of the second sun gear 60. As indicated in broken lines in FIG. 3, a first seal 92 can be located between the first external rim 56 and the recess 90 on the first axial side 17 of the planet gear 16, and a second seal 93 can be located between the second external rim 66 and the recess 91 on the second axial side 18 of the planet gear carrier 16. The seals 92, 93 may be formed as wiper seals or any other suitable seal arrangement. Additionally, seals could be located at a radial periphery of the first and second sun gears 50, 60 and contact the first and second axial side 17, 18 of the planet gear carrier 16.

Figure 17:
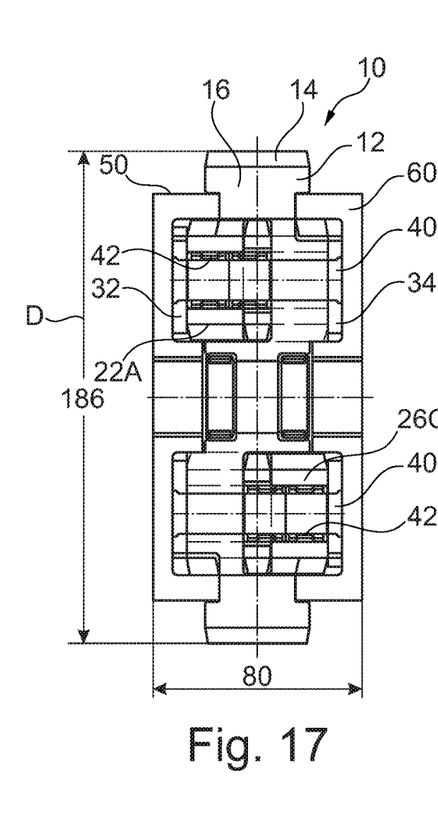
FIG. 17 is an elevational view, shown with some of the elements removed for clarity, of the compact planetary differential of FIGS. 1-3 including some preferred overall dimensions.

In order to ensure a compact size for the present compact planetary differential 10, preferably, the equal distance R of the axes of the first and second planet gears 22A-22C, 26A-26C, from the axis of the compact planetary gear differential is less than 60% of a diameter D of the input ring gear 12. This diameter D is shown in FIG. 17 for one preferred embodiment of the compact planetary differential 10. In an alternate embodiment shown in FIG. 18, the dimension D is even further reduced.

Additionally, in order to optimize the reduced radial envelope of the compact planetary differential 10, a radially inner most part of each of the first and second planet gears 22A-22C, 26A-26C, are radially within a small clearance distance from the radially outer part of the first and second hubs 52, 62 of the first and second sun gears 50, 60. This radial clearance dimension is preferably within about 0.2 inches of a radially outer part of the first and second hubs 52, 62. However, this dimension could be reduced, depending upon the particular tolerances of the parts of the compact planetary differential 10.

Figure 18:
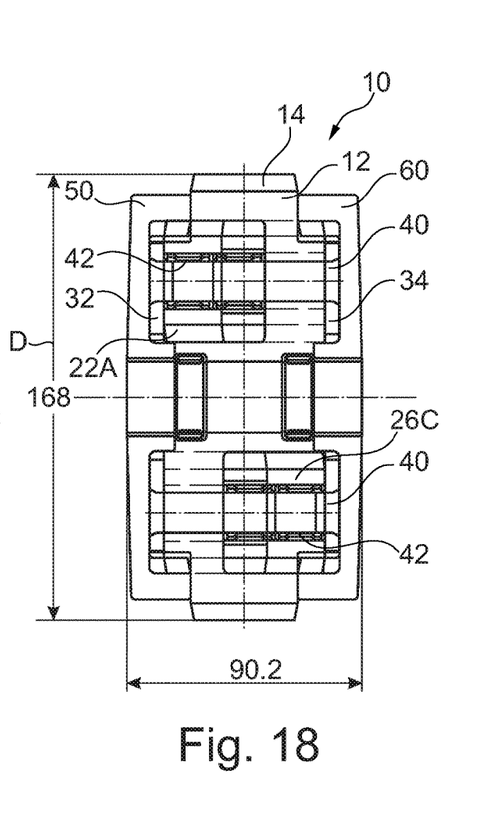
FIG. 18 is a view of an alternate arrangement of the compact planetary differential having a further reduced radial dimension and a slightly greater axial dimension.
Figure 19:
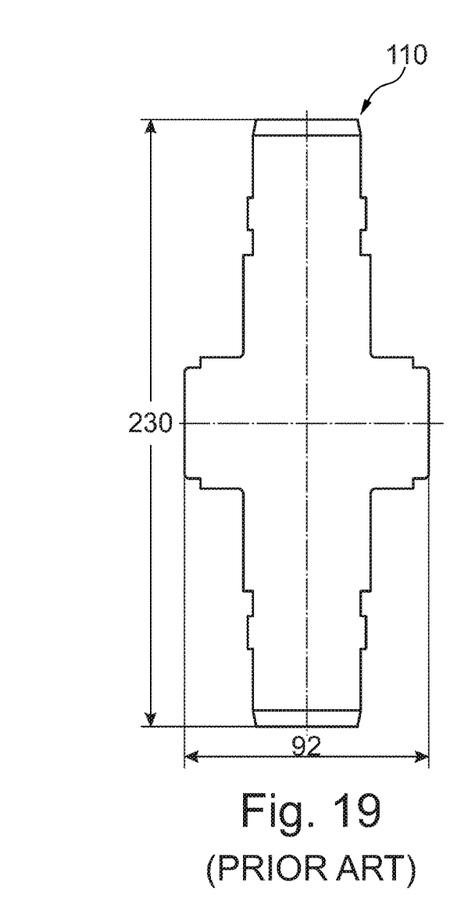
FIG. 19 is an envelope drawing of a prior known spur gear differential showing the known overall dimensions.

The compact size provided by the present compact planetary differential 10 in comparison to a known prior art spur gear differential is illustrated in FIGS. 17, 18, and 19, with FIG. 19 showing an envelope with the known dimensions of a prior art spur gear differential. As shown in the embodiment of FIG. 17, by locating the axes of the first and second planet gears 22A-22C, 26A-26C at a common distance R from the planetary differential axis which has a dimension that is less than 60% of a diameter D of the input gear ring 12, the overall radial size of the compact planetary differential is greatly reduced. Referring to FIG. 18, here the radial dimension is even further reduced by allowing an increase in the axial dimension, which may be appropriate for certain applications.

The compact differential 10 provides excellent differential function in a more compact size than was previously available, meeting the needs of today's modern motor vehicle designs.

In each of the above embodiments, all the rotating parts would be supported via appropriate bearings or bushings and the arrangements would be encased in an outer casing to allow for lubrication. As these items are customary in the art, they have not been described in further detail.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LIST OF REFERENCE NUMBERS 10 compact planetary differential
12 drive input ring gear
14 external teeth
16 planet gear carrier
17 first axial side
18 second axial side
19 first counter bores
20 second counter bores
22A-C first planet gears
24 teeth
26A-C second planet gears
28 teeth
30 interface openings
32 first pin plate
34 second pin plate
36 aligned openings
37 chamfer
38 aligned openings
39 chamfer
40 pinion shafts
42 needle bearing
44 pinion shaft openings
50 first sun gear
52 first hub
53 internal spline
54 first hub
56 first external rim
58 first internal ring gear
60 second sun gear
62 second hub
63 internal spline
64 second hub
66 second external rim
68 second internal ring gear 72 recess
74 recess
76 first support bearing
78 second support bearing
81 first axle
82 second axle
83 cylindrical support section
83 cylindrical support section
85 splined end
86 splined end
90 annular recess
91 annular recess
92 first seal
93 second seal

The invention claimed is:

1. A compact planetary differential, comprising:
   a drive input ring gear having external teeth;
   a planet gear carrier having first and second axial sides connected rotationally fixed to the drive input ring gear;
   first planet gears located on the first axial side of the planet gear carrier, and second planet gears located on the second axial side of the planet gear carrier, the first and second planet gears being arranged in intermeshing pairs, and the planet gear carrier including interface openings through which the respective intermeshing pairs of the first and second planet gears contact one another;
   first and second pin plates located respectively on the first and second axial sides of the planet gear carrier, the first and second pin plates including aligned openings at a position for each of the first planet gears and each of the second planet gears;
   pinion shafts extend through the aligned openings in the first and second pin plates and pinion shaft openings in the planet gear carrier, a single one of the first or second planet gears being rotatably supported on each respective one of the pinion shafts;
   a first sun gear located on the first axial side of the planet gear carrier that engages the first planet gears; and
   a second sun gear being located on the second axial side of the planet gear carrier that engages the second planet gears.

2. The compact planetary differential of claim 1, wherein the connection of the pinion shafts to the pin plates clamps the pin plates against the planet gear carrier.

3. The compact planetary differential of claim 1, wherein the first sun gear includes a first hub, a first web, and a first external rim with a first internal ring gear, and the first internal ring gear engages the first planet gears, the second sun gear includes a second hub, a second web, and a second external rim with a second internal ring gear, and the second internal ring gear engages the second planet gears, and the planet gear carrier includes at least one recess adjacent to the first and second hubs, and at least one support bearing located in the at least one recess which is adapted to receive ends of first and second axles that extend through the first and second hubs.

4. The compact planetary differential of claim 3, wherein the at least one recess comprises first and second recesses located respectively on the first and second axial sides of the planet gear carrier, and the at least one support bearing comprises first and second support bearings, and the first support bearing is located in the first recess and the second support bearing is located in the second recess.

5. The compact planetary differential of claim 1, wherein axially outwardly facing sides of the openings in the first and second pin plates are chamfered, and ends of the pinion shafts are staked in the openings.

6. The compact planetary differential of claim 3, wherein the first and second hubs include internal splines that are adapted to slidingly receive splined axle ends.

7. The compact planetary differential of claim 1, wherein axes of the first planet gears and axes of the second planet gears are located radially at an equal distance from an axis of the compact planetary differential, and the equal distance of the axes of the first and second planet gears from the axis of the compact planetary gear differential is less than 60% of a diameter of the input ring gear.

8. The compact planetary differential of claim 1, wherein at least one of the first sun gear and the second sun gear are interchangeable, the the first and second planet gears are interchangeable, or the first and second pin plates are interchangeable.

9. The compact planetary differential of claim 1, wherein the wherein the first sun gear and the second sun gear are forged to a net shape.

10. The compact planetary differential of claim 3, further comprising annular recesses on the first and second axial sides of the planet gear carrier which at least partially receive, respectively, the first external rim of the first sun gear and the second external rim of the second sun gear.

11. The compact planetary differential of claim 10, further comprising a first seal located between the first external rim and the recess in the first axial side of the planet gear carrier, and a second seal located between the second external rim and the recess in the second axial side of the planet gear carrier.

12. The compact planetary differential of claim 1, wherein the first planet gears axially overlap the second planet gears by 25% or more of an axial tooth dimension of the first and second planet gears.

13. The compact planetary differential of claim 1, wherein the planetary gear carrier includes first counterbores on the first axial side that receive the first planetary gears and second counterbores on the second axial side that receive the second planetary gears, and the interface openings are formed by an axial overlap of the first and second counterbores.

14. The compact planetary differential of claim 1, wherein the drive input ring gear is formed as a separate part from steel and is connected to the planet gear carrier.

15. The compact planetary differential of claim 3, wherein a radially innermost part of each of the first and second planet gears are radially within 0.2 inches of a radially outer part of the first and second hubs to provide a radially compact arrangement.

16. A compact planetary differential, comprising:
   a drive input ring gear having external teeth;
   a planet gear carrier having first and second axial sides connected rotationally fixed to the drive input ring gear;
   first planet gears located on the first axial side of the planet gear carrier, and second planet gears located on the second axial side of the planet gear carrier, the first and second planet gears being arranged in intermeshing pairs, and the planet gear carrier including interface openings through which the respective intermeshing pairs of the first and second planet gears contact one another;
   first and second pin plates located respectively on the first and second axial sides of the planet gear carrier, the first and second pin plates including aligned openings at a position for each of the first planet gears and each of the second planet gears;

pinion shafts extend through the aligned openings in the first and second pin plates and pinion shaft openings in the planet gear carrier, a single one of the first or second planet gears being rotatably supported on each respective one of the pinion shafts;

a first sun gear located on the first axial side of the planet gear carrier, the first sun gear includes a first internal ring gear that engages the first planet gears, and a first hub;

a second sun gear being located on the second axial side of the planet gear carrier, the second sun gear includes a second internal ring gear that engages the second planet gears, and a second hub; and the planet gear carrier includes at least one recess adjacent to the first and second hubs, and at least one support bearing located in the at least one recess which is adapted to receive ends of first and second axles that extend through the first and second hubs.

17. The compact planetary differential of claim 16, wherein the connection of the pinion shafts to the pin plates clamps the pin plates against the planet gear carrier.

18. The compact planetary differential of claim 16, wherein axially outwardly facing sides of the openings in the first and second pin plates are chamfered, and ends of the pinion shafts are staked in the openings to clamp the pin plates against the carrier.

19. The compact planetary differential of claim 16, wherein axes of the first planet gears and axes of the second planet gears are located radially at an equal distance from an axis of the compact planetary differential.

20. The compact planetary differential of claim 16, further comprising annular recesses on the first and second axial sides of the planet gear carrier which at least partially receive, respectively, a first external rim of the first sun gear and a second external rim of the second sun gear.

* * * * *